United States Patent [19]

Takahashi

[11] Patent Number: 4,789,179

[45] Date of Patent: Dec. 6, 1988

[54] ARRANGEMENT FOR HOLDING SEAT BELT ANCHOR BAND

[75] Inventor: Fugio Takahashi, Kanagawa, Japan

[73] Assignee: Ikeda Bussan Co., Ltd., Ayase, Japan

[21] Appl. No.: 62,686

[22] Filed: Jun. 16, 1987

[30] Foreign Application Priority Data

Jul. 31, 1986 [JP] Japan .............................. 61-118194[U]

[51] Int. Cl.[4] .............................................. B60R 21/10
[52] U.S. Cl. ...................................... 280/801; 297/481
[58] Field of Search .................. 280/801; 297/481, 485

[56] References Cited

U.S. PATENT DOCUMENTS 3,740,094  6/1973  Hornyak ............................ 297/481
4,210,365  7/1980  Breitschwerdt et al. ............ 297/481

FOREIGN PATENT DOCUMENTS 51126   5/1982  European Pat. Off. ............ 280/801
 2729258   1/1979  Fed. Rep. of Germany ...... 297/481
56-171063 12/1871  Japan .
50-125925 10/1975  Japan .
 1229896   4/1971  United Kingdom ................ 297/481

Primary Examiner—David M. Mitchell
Assistant Examiner—Ross Weaver
Attorney, Agent, or Firm—Foley & Lardner, Schwartz, Jeffery, Schwaab, Mack, Blumenthal & Evans

[57] ABSTRACT

Herein disclosed is an arrangement for holding, when a seat belt is not in use, a buckle-mounted anchor band of the seat belt on a given portion of a seat back of a seat. The arrangement comprises a holder tightly connected to the seat back and having a first engaging portion projected from the seat back, and a plastic cover covering and connected to the buckle of the anchor band and having a second engaging portion which is detachably engageable with the first engaging portion of the holder. One of the first and second engaging portions has a flexible portion which is resiliently flexed to cancel the engagement between the first and second engaging portions when an abnormally big force is applied thereto in a direction to increase the degree of the engagement.

6 Claims, 3 Drawing Sheets

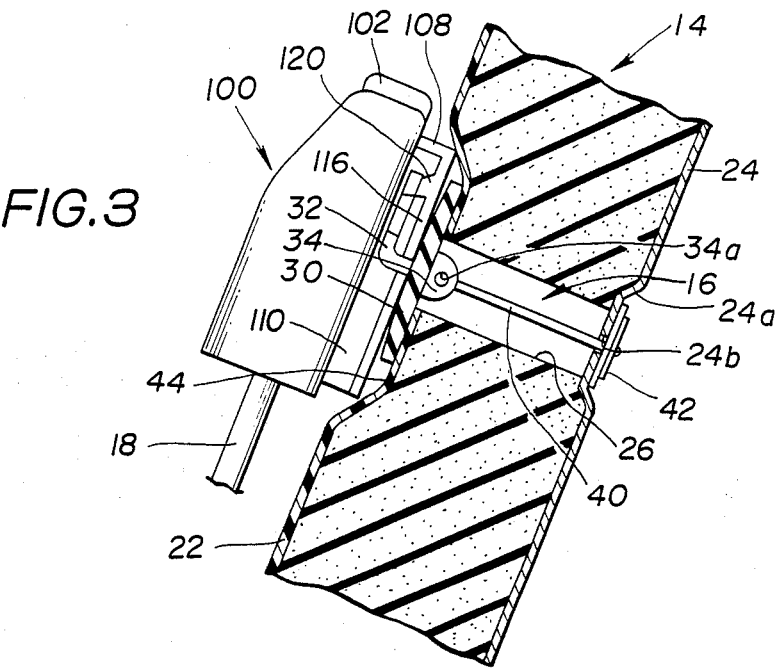
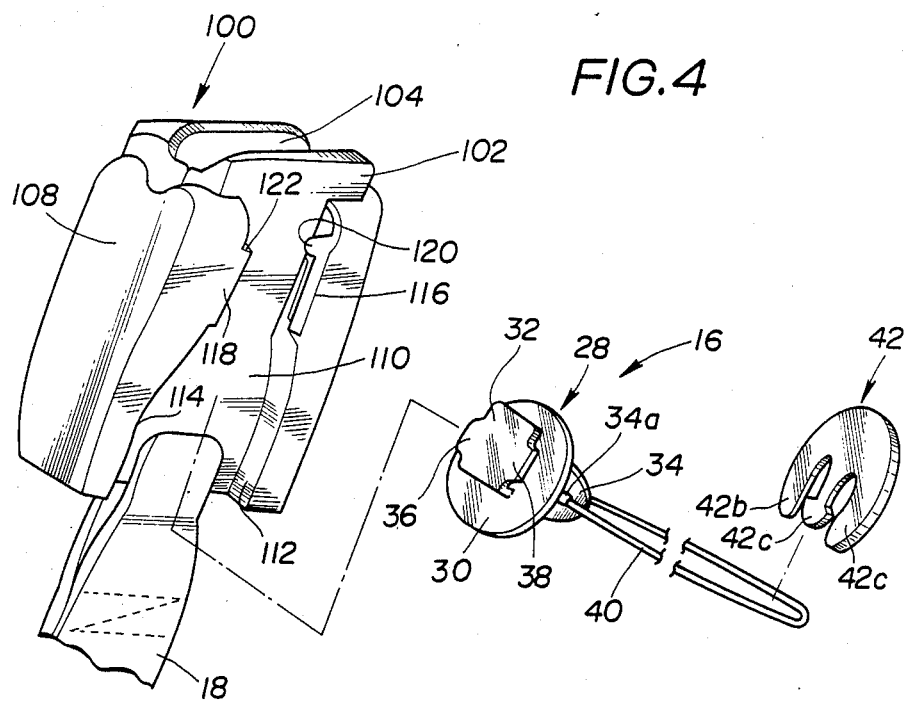

4,789,179

ARRANGEMENT FOR HOLDING SEAT BELT ANCHOR BAND

BACKGROUND OF THE INVENTION

1. Field of the Invention

The present invention relates in general to a safety seat belt for use in a motor vehicle, and more particularly to an arrangement for holding a buckle-mounted anchor band of the seat belt on a given portion of the vehicle seat when the seat belt is not in use.

2. Description of the Prior Art

As is known, seat belts have been widely usesd in motor vehicles for protecting the passengers from a vehicle collision. Usually, the seat belt comprises a tongue-mounted seat belt proper having one end fixed to a vehicle body and the other end connected through a belt retractor to the vehicle body, and a buckle-mounted anchor band fixed to the vehicle body. Upon requirement of seat belt use, the tongue is brought into engagement with the buckle drawing the belt proper from the belt retractor. With this, the passenger on the seat is held steady by the seat belt in a so-called three point supporting manner.

When, upon requirement of seat belt releasing, the tongue is disengaged from the buckle, the seat belt proper is retracted by the belt retractor to such a degree as to neatly tighten the unretracted part of the belt.

However, hitherto, handling of the buckle-mounted anchor band when the seat belt is not in use has been given little thought. In fact, when the seat belt is not in use, the anchor band is left loosely or slovenly on a seat or its neighbouring portion spoiling the internal view of the vehicle.

SUMMARY OF THE INVENTION

It is therefore an essential object of the present invention to provide an arrangement for neatly holding a buckle-mounted anchor band of the seat belt on a given portion of the seat when the seat belt is not in use.

According to the present invention, there is provided an anchor band holder mounted to the seat back of a seat, which is constructed to release the buckle-mounted anchor band when an abnormally big force is suddenly applied to the anchor band.

According to the present invention, there is provided an arrangement for holding a buckle-mounted anchor band on a given portion of a seat back of a seat. The arrangement comprises a holder tightly connected to the seat back and having a first portion projected from the seat back, a cover connected to the buckle of the anchor band to cover the same and movable therewith, the cover having a second portion which is detachably engageable with the first portion of the holder, and means defined by either one of the first and second portions for cancelling the engagement between the first and second portions when an abnormally big force is applied thereto in a direction to increase the degree of the engagement.

BRIEF DESCRIPTION OF THE DRAWINGS

Other objects and advantages of the present invention will become apparent from the following description when taken in conjunction with the accompanying drawings, in which:

FIG. 3 is an enlarged view of the part enclosed by the circle III of FIG. 2;

FIG. 4 is a perspective view of parts employed in the arrangement of the first embodiment;

DETAILED DESCRIPTION OF THE INVENTION

Figure 1:
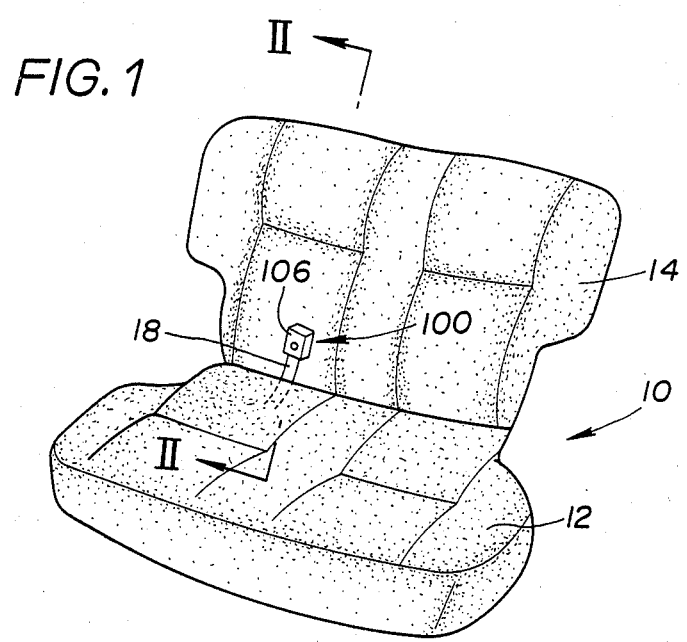
FIG. 1 is a perspective view of an automotive seat which is equipped with an anchor band holding arrangement of a first embodiment of the present invention.

Referring to FIG. 1, there is shown an automotive seat 10 which comprises generally a seat cushion 12 and a seat back 14. The seat 10 is provided with an anchor band holding arrangement of the present invention, which, as will be described in detail hereinafter, has an anchor band holder 16 (see FIG. 2) for holding an anchor band 18 of a seat belt (not shown) on a given portion of the seat back 14.

Figure 2:
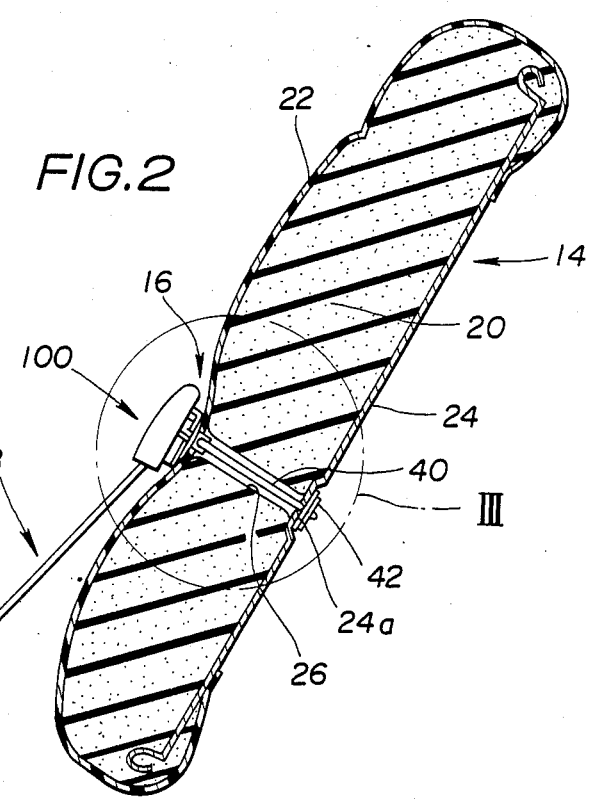
FIG. 2 is an enlarged sectional view taken along the line II—II of FIG. 1.

As is seen from FIG. 2, the seat back 14 illustrated comprises a foamed pad member 20, a flexible skin member covering a front side of the pad member 20 and a pan-frame 24 covering a rear side of the pad member 20.

As is seen from FIG. 4, the anchor band 18 is equipped at its leading end with a buckle device 100 for detachably connecting with a tongue member (not shown) of the seat belt upon in use of the seat belt. As is seen from FIG. 1, the anchor band 18 is fixed at its lower end to a vehicle floor and extends upward through a clearance between the seat cushion 12 and the seat back 14 having the buckle device 100 thereof exposed to the front portion of the seat 10.

As is seen from FIG. 4, the buckle device 100 comprises a known buckle proper 102 which has a bore 104 formed therethrough. A latching mechanism (not shown) is mounted in the bottom of the bore 104 for latching the tongue member of the seat belt proper when the tongue member is fully inserted into the bore 104. A known release button 106 (see FIG. 1) is arranged on a front side of the buckle device 100, which cancels the latched condition of the latching mechanism upon depression thereof. The buckle proper 102 is fixed at its base portion to the leading end of the anchor band 18. The buckle proper 102 is enclosed by a cover 108 made of plastics or the like.

The cover 108 is formed at the back side thereof with a longitudinally extending slot 110 which is gradually narrowed toward the fore portion thereof, as is seen from FIG. 4. Opposed side walls of the slot 110 are denoted by numerals 112 and 114. The side walls 112 and 114 are formed at their fore portions with respective flanges 116 and 118 the foremost ends of which are enlarged to form projections 120 and 122. The projections 120 and 122 are so constructed that when a given magnitude of external force is applied thereto, they are resiliently flexed for the purpose which will become apparent as the description proceeds.

The anchor band holder 16 functions to hold the anchor band 18, more particularly, the buckle device 100 on a given portion of the seat back 14 when the seat belt is not in use. As is seen from FIG. 3, in order to mount the anchor band holder 16 thereto, the seat back 14 is formed at a given portion thereof with a bore 26 which is fully open at its front end and substantially closed at its rear end by the pan-frame 24. For the purpose which will be clarified hereinafter, the pan-frame 24 is somewhat depressed inward at a portion 24a thereof exposed to the bore 26, and the depressed portion 24a is formed with a small opening 24b.

As is best seen from FIGS. 3 and 4, the anchor band holder 16 comprises a button member 28 made of plastics or the like, which is attached to the mouth portion of the bore 26 of the seat back 14 in a manner as will be described hereinafter. The button member 28 comprises a circular base portion 30, a generally rectangular lug portion 32 projected from one or front side of the base portion 30 and a semicircular projection 34 raised from the other or rear side of the base portion 30. The circular base portion 30 has a size considerably larger than the section of the bore 26, and the lug portion 32 is formed at its opposed sides with flanges 36 and 38. It is to be noted that the flanged lug portion 32 is constructed to match with the aforementioned flanged fore portion of the slot 110 of the buckle device 100, so that they are slidably engageable. It is further to be noted that the distance between the flanges 36 and 38 of the lug portion 30 is somewhat greater than that between the afore-mentioned projections 120 and 122 of the slot 110 of the buckle device 100.

As is seen from FIG. 3, the button member 28 is attached to the front face of the seat back 14 having the semicircular projection 34 projected into the bore 26. The projection 34 is formed with a small opening 34a through which a looped string 40 made of flexible plastics or the like passes. The string 40 extends rearward through the bore 26 and through the small opening 24b of the pan-frame 24 and is exposed to the outside of the seat back 14. The exposed end of the string 40 is fastened to the depressed portion 24a of the pan-frame 24 by a fastener 42. The length of the looped string 40 is so determined that upon assembly the button member 38 is pressed tightly against the front face of the seat back 14 thereby to provide the front face with a suitable depression 44 in which the button member 28 is neatly received. As is seen from FIG. 4, the fastener 42 is of a generally E-shaped type which comprises a generally arrow like center pin 42a and curved side pins 42b and 42c.

In the following, the work for assembling the anchor band holder 16 to the seat back 14 will be described with reference to FIGS. 3 and 4.

First, the string 40 is connected to the button member 28 by passing the same through the opening 34a of the semicircular projection 34. Then, the button member 28 is brought to the mouth portion of the bore 26 of the seat back 14 having the string 40 put into the bore 26. A suitable tool (not shown) is inserted through the opening 24b of the pan-frame 24 into the bore 26 for catching a portion of the string 40, and the tool is withdrawn from the bore 26 for pulling the portion of the string 40 out of the opening 24b of the pan-frame 24. Then, the fastener 42 is engaged with the exposed portion of the string 40 and seated on the depressed portion 24a of the pan-frame 24.

Upon requirement of holding the anchor band 18, the buckle device 100 of the anchor band 18 is handled to place the enlarged aft portion of the slot 110 thereof over the lug portion 32 of the button member 28 and the buckle device 100 is pulled downward. With this, the flanged fore portion of the slot 110 of the buckle device 100 is brought into engagement with the lug portion 32 of the button member 28. Because of the provision of the projections 120 and 122 on the flanges 116 and 118, the engagement is assured.

When, upon requirement of use of the seat belt, the buckle device 100 is pulled upward, the same is released from the holder 16 for a reason which will be easily understood from the above explanation.

When, with the buckle device 100 held by the holder 16, an abnormally big force is suddenly applied to the anchor band 18 in a direction to pull the buckle device 100 downward, the projections 120 and 122 of the buckle device 100 are resiliently flexed to such a degree as to disengage the buckle device 100 from the holder 16, that is, from the button member 28. Thus, the holder 16 is not damaged.

Figure 5:
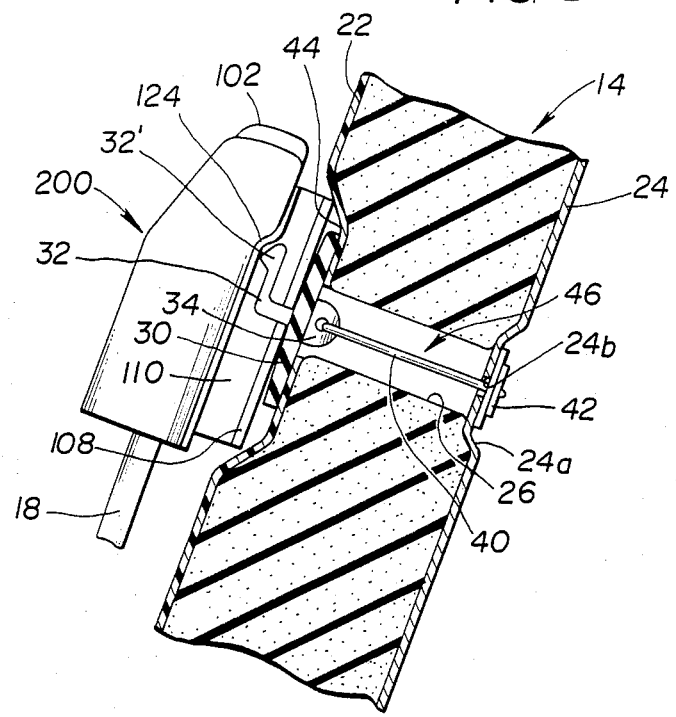
FIG. 5 is a view similar to FIG. 3, but showing an arrangement of a second embodiment of the present invention.
Figure 6:
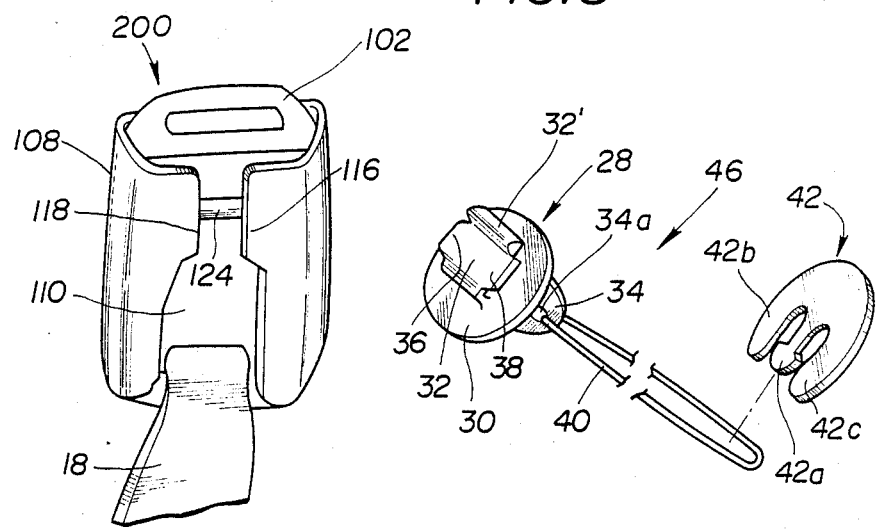
FIG. 6 is a perspective view of parts employed in the arrangement of the second embodiment

Referring to FIGS. 5 and 6, there is shown an anchor band holding arrangement of a second embodiment of the present invention.

As is seen from FIG. 6, the buckle device 200 incorporated with the arrangement comprises a known buckle proper 102 and a cover 108. The cover 108 is formed at the back side thereof with a longitudinally extending slot 110 the fore portion of which is narrowed by respective flanges 116 and 118. Denoted by numeral 124 is a step which is formed on a back surface of the buckle proper 102, as will be seen from FIG. 5. The step 124 is arranged to run across tdhe narrowed section of the slot 110 of the cover 108, as is understood from FIG. 6.

The anchor band holder 46 employed in the second embodiment is substantially the same as that of the afore-mentioned first embodiment except for the shape of the lug portion of the button member. That is, as is seen from the drawings, the lug portion 32 of the button member 28 of the second embodiment is further formed at its upper end with an elongate raised portion 3'.

Upon requirement of anchor band holding, the buckle device 200 is handled to place the enlarged aft portion of the slot 110 thereof over the lug portion 32 of the button member 28 and the buckle device 200 is pulled downward. With this, the flanged or narrowed fore portion of the slot 110 of the buckle device 200 is brought into engagement with the lug portion 32 of the button member 28. The engagement becomes assured when the raised portion 32' of the lug portion 32 is brought into contact with the step 124 of the buckle proper 102, as will be seen from FIG. 5.

Of course, the buckle device 200 is readily released from the holder 46, that is, from the lug portion 32 of the button member 28 when the same is pulled upward.

When, with the buckle device 200 held by the holder 46, an abnormally big force is applied to the anchor band 18 in a direction to pull the bucke device 200 downward, the lug portion 32 of the button member 28 is resiliently flexed to such a degree as to permit the raised portion 32' thereof to ride over the step 124 of the buckle proper 102, resulting in that the buckle device 200 is disengaged from the holder 46, that is, from the button member 28. Thus, similar to the case of the first embodiment, the holder 46 is not damaged.

What is claimed is:

1. An arrangement for detachably fixing a buckle-mounted anchor band of a seat belt to a given portion of a seat back of a seat, comprising:
   a holder tightly connected to said seat back and provided at laterally opposed sides with respectively outwardly protruding flanges; and a cover member housing therein the buckle of the anchor band and fixed thereto to move therewith, said cover member being constructed to a resiliently deformable plastic and formed with a longitudinally extending slot which comprises first, second and third parts arranged to provide said first part having a width which is greater than the distance between the outwardly protruded flanges of said holder, said second part having a width which is so sized as to slidably hold said outwardly protruded flanges by opposed flange portions thereof and said third part having opposed projections and a width which is smaller than the distance between said outwardly protruded flanges and extending to a terminal open end of said slot, whereby when, with said holder being coupled with said slot of the cover member, a force greater than a predetermined degree is applied to said holder to move the same in a direction from said second part to said third part, said opposed projections of said third part are resiliently deformed to release said holder from said slot.

2. The arrangement as claimed in claim 1, in which said flanges are provided on a lug member formed on said holder.

3. The arrangement as claimed in claim 2, in which said holder includes a base portion spaced from said lug member.

4. The arrangement as claimed in claim 3, in which said base portion is fastened to said seat back by fastening means.

5. The arrangement as claimed in claim 2, in which said holder comprises:
   a base portion connected to and spaced from said lug member;
   a string extending rearward from said base portion through a bore formed in said seat back; and
   a fastener connected to said string to fasten the same to a rear surface of said seat back.

6. The arrangement as claimed in claim 5, in which said base portion is formed with a projection which is projected into said bore and formed with an opening through which said string passes.

* * * * *